(12) United States Patent
Hoshina et al.

(10) Patent No.: US 12,323,698 B2
(45) Date of Patent: Jun. 3, 2025

(54) ELECTRONIC DEVICE AND CONTROL METHOD THEREOF

(71) Applicant: CANON KABUSHIKI KAISHA, Tokyo (JP)

(72) Inventors: Takayuki Hoshina, Kanagawa (JP); Shotaro Yanai, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/502,916

(22) Filed: Nov. 6, 2023

(65) Prior Publication Data

US 2024/0073516 A1 Feb. 29, 2024

Related U.S. Application Data

(63) Continuation of application No. 18/060,656, filed on Dec. 1, 2022, now Pat. No. 11,838,620.

(30) Foreign Application Priority Data

Dec. 6, 2021 (JP) .................................. 2021-197874

(51) Int. Cl.
*H04N 23/60* (2023.01)
*H04N 23/611* (2023.01)
(Continued)

(52) U.S. Cl.
CPC ........... *H04N 23/64* (2023.01); *H04N 23/611* (2023.01); *H04N 23/65* (2023.01); *H04N 23/667* (2023.01)

(58) Field of Classification Search
CPC ...... H04N 23/64; H04N 23/611; H04N 23/65; H04N 23/667; H04N 1/00352; H04N 1/00; H04N 1/00411; H04N 1/00413; H04N 1/00912; H04N 23/60; H04N 23/651; H04N 23/6812; Y02D 10/00
See application file for complete search history.

(56) References Cited

U.S. PATENT DOCUMENTS 7,253,836 B1 * 8/2007 Suzuki .................... H04N 5/772
382/260
9,756,249 B1 * 9/2017 Segapelli ............... H04N 5/144
(Continued)

FOREIGN PATENT DOCUMENTS

JP 2002-252804 A 9/2002

*Primary Examiner* — Yogesh K Aggarwal
(74) *Attorney, Agent, or Firm* — Cowan, Liebowitz & Latman, P.C.

(57) ABSTRACT

In an electronic device, a memory temporarily holds image data output from an image sensor during a first operation instruction instructing preparation for shooting is output, and an acquisition unit repeatedly acquires determination information used for estimating a level of possibility that a second operation instruction for instructing recording of a shot image will be output. A controller controls image shooting and to hold image data in the memory by a first control if the level is a first level, and by a second control that can reduce power consumption if the level is a second level which is lower than the first level. When the second operation instruction is output, the image data of an image shot in response to the second operation instruction and the latest image data held in the memory are recorded on a recording medium.

12 Claims, 8 Drawing Sheets

(51) Int. Cl.
*H04N 23/65* (2023.01)
*H04N 23/667* (2023.01)

(56) References Cited

U.S. PATENT DOCUMENTS

| | | |
|---|---|---|
| 2018/0218755 A1 | 8/2018 | Kawaguchi et al. |
| 2021/0182610 A1 | 6/2021 | Yoshino |
| 2022/0124242 A1* | 4/2022 | Gruhlke ............... A61B 3/0025 |

* cited by examiner

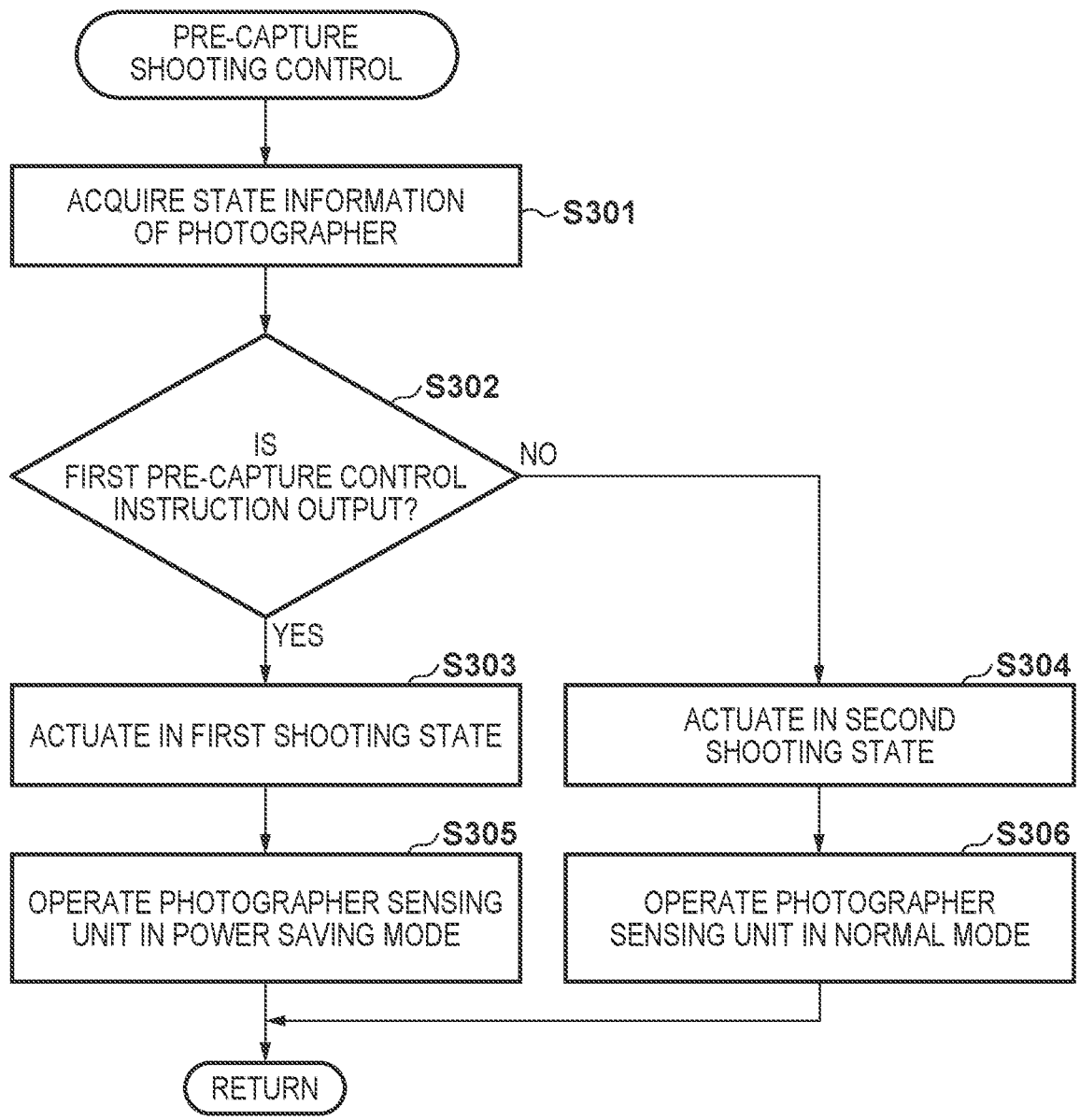

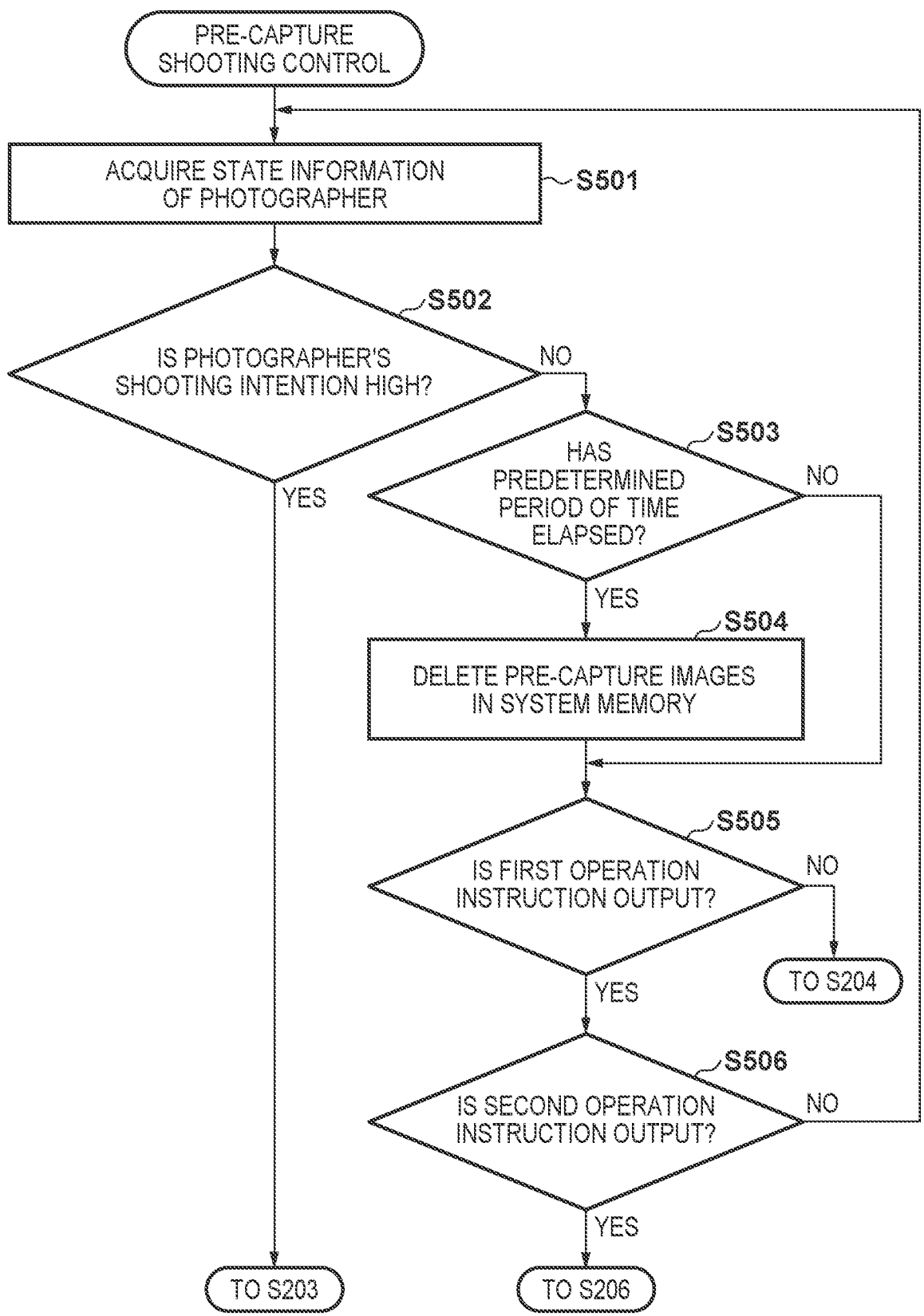

ELECTRONIC DEVICE AND CONTROL METHOD THEREOF

CROSS-REFERENCE TO RELATED APPLICATION

This application is a continuation of application Ser. No. 18/060,656, filed Dec. 1, 2022, the entire disclosure of which are hereby incorporated by reference.

BACKGROUND OF THE INVENTION

Field of the Invention

The present invention relates to an electronic device and a control method thereof, and more particularly to a shooting control technique in an electronic device.

Description of the Related Art

Conventionally, in an electronic device having an image shooting function, such as a digital camera, there are cases in which images intended by a photographer are not captured because of a time lag between when a photographer presses a release button of the camera to instruct image shooting and when the image shooting actually starts.

As a counter measure to the above problem, Japanese Patent Laid-Open No. 2002-252804 proposes a camera having a pre-capture function. The pre-capture function is a function of repeatedly executing image shooting and storing a predetermined number of images of the same quality as still images in the buffer memory while the release button is pressed to a first stage. Then, when the release button is pressed to a second stage, the images stored in the buffer memory and an image taken when the release button is pressed to the second stage are stored in a recording medium.

By using such a pre-capture function, it is possible to retroactively shoot and record images from the moment when the photographer instructed image shooting, so that it is possible to obtain an image intended by the photographer.

The pre-capture function disclosed in Japanese Patent Laid-Open No. 2002-252804 is effective in a case where the shooting intention is high, such as a case where the photographer is looking at a subject and is aiming at the shooting timing. However, if the shooting intention is low, power is wasted due to continued shooting. On the other hand, if the camera waits without using the pre-capture function, there is a possibility that the shooting chance may be missed due to the time lag, and the desired image may not be obtained. Therefore, it is desirable to continue the pre-capture function.

SUMMARY OF THE INVENTION

The present invention has been made in consideration of the above situation, and enables a pre-capture function to be effectively used while suppressing power consumption.

According to the present invention, provided is an electronic device comprising: an operation unit that outputs a first operation instruction for instructing preparation for shooting and a second operation instruction for instructing recording of a shot image; and one or more processors and/or circuitry which functions as: an acquisition unit that repeatedly acquires determination information used for estimating a level of possibility that the second operation instruction will be output; a memory that temporarily holds image data output from an image sensor during the first operation instruction is output and kept; a controller that, during the first operation instruction is output and kept, performs a control for performing shooting by the image sensor to acquire image data and holding the image data in the memory by a first control in a case where the level estimated based on the determination information is a first level, and by a second control that can reduce power consumption compared to the first control in a case where the level is a second level which is lower than the first level; and a recording unit that, in a case where the second operation instruction is output, records on a recording medium image data of an image shot by the image sensor in response to the second operation instruction and image data held in the memory at a timing closest to the output timing of the second operation instruction.

Further, according to the present invention, provided is an electronic device comprising: an operation unit that outputs a first operation instruction for instructing preparation for shooting and a second operation instruction for instructing recording of a shot image; and one or more processors and/or circuitry which functions as: an acquisition unit that repeatedly acquires determination information used for estimating a level of possibility that the second operation instruction will be output; a memory that temporarily holds image data output from an image sensor during the level is a first level which indicates that the possibility is high; a controller that starts a control for performing shooting by the image sensor to acquire image data and holding the image data in the memory by a first control in response that the level is estimated as the first level based on the determination information, and performs the control by a second control that can reduce power consumption compared to the first control in a case where the first operation instruction is not output for a predetermined first period since the level is estimated as the first level; and a recording unit that, in a case where the second operation instruction is output, records on a recording medium image data of an image shot by the image sensor in response to the second operation instruction and image data held in the memory at a timing closest to the output timing of the second operation instruction.

Furthermore, according to the present invention, provided is a control method of an electronic device comprising: detecting a first operation instruction out of the first operation instruction for instructing preparation for shooting and a second operation instruction for instructing recording of a shot image, the first and second operation instructions being output from an operation unit; temporarily holding image data output from an image sensor in a memory during the first operation instruction is output and kept; repeatedly acquiring determination information used for estimating a level of possibility that the second operation instruction will be output; performing, during the first operation instruction is output and kept, a control for performing shooting by the image sensor to acquire image data and holding the image data in the memory by a first control in a case where the level estimated based on the determination information is a first level, and by a second control that can reduce power consumption compared to the first control in a case where the level is a second level which is lower than the first level; detecting the second operation instruction; and recording, in a case where the second operation instruction is detected, on a recording medium image data of an image shot by the image sensor in response to the second operation instruction and image data held in the memory at a timing closest to the detected timing of the second operation instruction.

Further, according to the present invention, provided is a control method of an electronic device comprising: detecting a first operation instruction out of the first operation instruction for instructing preparation for shooting and a second operation instruction for instructing recording of a shot image, the first and second operation instructions being output from an operation unit; repeatedly acquiring determination information used for estimating a level of possibility that the second operation instruction will be output; temporarily holding image data output from an image sensor in a memory during the level is a first level which indicates that the possibility is high; starting a control for performing shooting by the image sensor to acquire image data and holding the image data in the memory by a first control in response that the level is estimated as the first level based on the determination information, and performing the control by a second control that can reduce power consumption compared to the first control in a case where the first operation instruction is not output for a predetermined first period since the level is estimated as the first level; detecting the second operation instruction; and recording, in a case where the second operation instruction is detected, on a recording medium image data of an image shot by the image sensor in response to the second operation instruction and image data held in the memory at a timing closest to the detected timing of the second operation instruction.

Further, according to the present invention, provided is a non-transitory computer-readable storage medium, the storage medium storing a program that is executable by the computer, wherein the program includes program code for causing the computer to function as an electronic device comprising: an operation unit that outputs a first operation instruction for instructing preparation for shooting and a second operation instruction for instructing recording of a shot image; and an acquisition unit that repeatedly acquires determination information used for estimating a level of possibility that the second operation instruction will be output; a memory that temporarily holds image data output from an image sensor during the first operation instruction is output and kept; a controller that, during the first operation instruction is output and kept, performs a control for performing shooting by the image sensor to acquire image data and holding the image data in the memory by a first control in a case where the level estimated based on the determination information is a first level, and by a second control that can reduce power consumption compared to the first control in a case where the level is a second level which is lower than the first level; and a recording unit that, in a case where the second operation instruction is output, records on a recording medium image data of an image shot by the image sensor in response to the second operation instruction and image data held in the memory at a timing closest to the output timing of the second operation instruction.

Further, according to the present invention, provided is a non-transitory computer-readable storage medium, the storage medium storing a program that is executable by the computer, wherein the program includes program code for causing the computer to function as an electronic device comprising: an operation unit that outputs a first operation instruction for instructing preparation for shooting and a second operation instruction for instructing recording of a shot image; and an acquisition unit that repeatedly acquires determination information used for estimating a level of possibility that the second operation instruction will be output; a memory that temporarily holds image data output from an image sensor during the level is a first level which indicates that the possibility is high; a controller that starts a control for performing shooting by the image sensor to acquire image data and holding the image data in the memory by a first control in response that the level is estimated as the first level based on the determination information, and performs the control by a second control that can reduce power consumption compared to the first control in a case where the first operation instruction is not output for a predetermined first period since the level is estimated as the first level; and a recording unit that, in a case where the second operation instruction is output, records on a recording medium image data of an image shot by the image sensor in response to the second operation instruction and image data held in the memory at a timing closest to the output timing of the second operation instruction.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 3 is a flowchart showing pre-capture shooting control according to the first embodiment;

FIG. 5 is a flowchart showing pre-capture shooting control according to the second embodiment;

DESCRIPTION OF THE EMBODIMENTS

Figure 1:
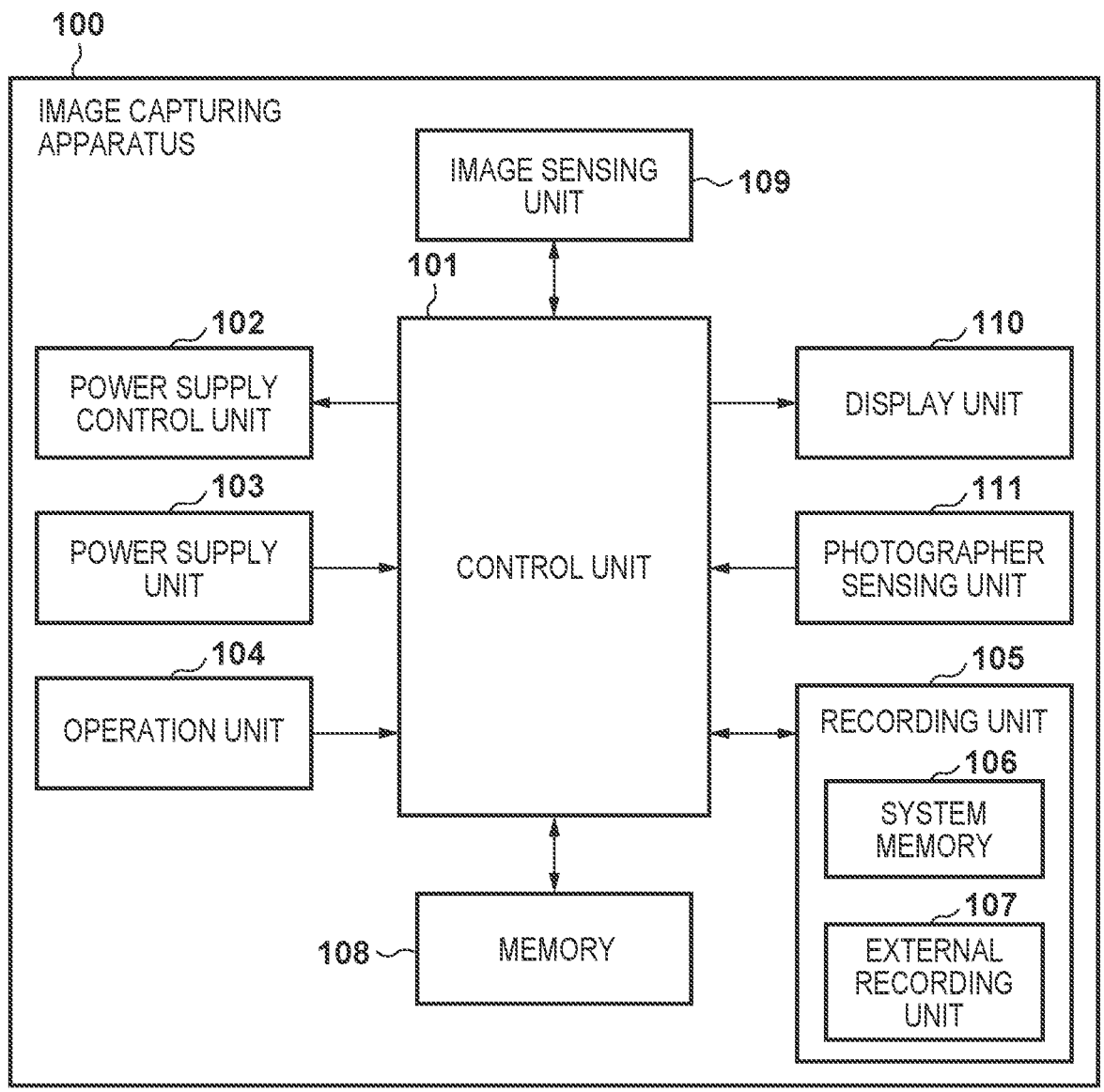
FIG. 1 is a block diagram showing an example of hardware configuration of an image capturing apparatus according to an embodiment of the present invention.

Hereinafter, embodiments will be described in detail with reference to the attached drawings. Note, the following embodiments are not intended to limit the scope of the claimed invention, and limitation is not made an invention that requires a combination of all features described in the embodiments. Two or more of the multiple features described in the embodiments may be combined as appropriate. Furthermore, the same reference numerals are given to the same or similar configurations, and redundant description thereof is omitted.

FIG. 1 is a block diagram showing a hardware configuration of an image capturing apparatus 100 according to an embodiment of the present invention. Note that the image capturing apparatus 100 may be any electronic device having a camera function. For example, it may be a camera such as a digital camera or a digital video camera, a mobile phone with a camera, a computer with a camera, a game machine, or the like.

A control unit 101 controls the operation of the entire image capturing apparatus 100 and is composed of at least one processor. The control unit 101 reads out a program for controlling the image capturing apparatus 100 from a memory 108 and develops part of the program in a system memory 106, thereby controlling the entire image capturing apparatus 100.

A power supply control unit 102 is composed of a battery detection circuit, a protection circuit, a DC-DC converter, an LDO regulator, and so forth, and converts the power supplied from a power supply unit 103 into a voltage suitable for each electronic device constituting the image capturing apparatus 100, and supplies the converted power to each electronic device. In addition, the power supply control unit 102 has functions such as detecting whether or not a battery is installed, the type of the battery, and the remaining amount of the battery, and protecting load circuits connected to a power supply circuit by shutting off the power supply when overcurrent is detected. Furthermore, the power supply control unit 102 has a power detection circuit capable of detecting the amount of power to be supplied to each part of the image capturing apparatus 100.

The power supply unit 103 is composed of secondary batteries such as NiCd batteries, NiMH batteries, and Li batteries, an AC adapter, and the like. Furthermore, it has a circuit for acquiring the remaining battery level, and can notify the control unit 101 of the acquired remaining battery level through communication.

An operation unit 104 has operation members for inputting various operation instructions to the control unit 101. The operation unit 104 is composed of any one of switches, dials, a touch panel, a voice recognition device, etc., or a combination thereof. A release button, which is one of the operation units 104, is composed of a two-stage switch of a first release switch and a second release switch. When the first release switch is turned on by a pressing operation to the first stage (e.g., half-pressing), a first operation instruction to instruct preparation for shooting is issued, and when the second release switch is turned on by a pressing operation to the second stage (e.g., full-pressing), a second operation instruction to record a shot image is output to the control unit 101. In the present invention, the operation member for outputting the first operation instruction and the second operation instruction is not limited to the release button, and any structure is acceptable as long as the first operation instruction and the second operation instruction can be output.

A recording unit 105 includes the system memory 106 and an external recording unit 107. The system memory 106 is composed of a RAM or the like, and is used to expand programs read from the memory 108 and constants, variables, etc. used for the operation of the control unit 101. In addition, the system memory 106 sequentially and temporarily stores the image data of images (referred to as "pre-capture images", hereinafter) which are obtained by repeatedly performing pre-capture shooting before the main shooting is performed and have the same or nearly the same quality as an image to be obtained in the main shooting. Then, when a predetermined number of pre-capture images are held, the oldest pre-capture image among the held pre-capture images is deleted and a new pre-capture image is held. The external recording unit 107 is a detachable recording medium such as a semiconductor memory, and records image data of pre-capture images and images obtained in the main shooting.

The memory 108 is composed of an electrically erasable/storable non-volatile memory, a ROM, etc., and stores constants, programs, etc. for the operation of the control unit 101. The program referred to here includes a program for executing processing shown in flow charts described later in this embodiment.

An image sensing unit 109 is composed of an image sensor such as a CMOS sensor, CCD, and the like, performs shooting based on instructions from the control unit 101, and transmits acquired image information (image data, etc.) to the control unit 101.

A display unit 110 has a liquid crystal device, a speaker, etc., for showing operation states, messages, and so forth using characters, images, and sound according to the execution of the program in the control unit 101. It is comprised of a combination of EVF, LCD, LED, audio elements and the like.

A photographer sensing unit 111 detects status information (judgment information) of a photographer and notifies the control unit 101 of the detected status information of the photographer. The photographer sensing unit 111 includes one of an in-camera capable of shooting the photographer, a camera shake detection sensor capable of detecting an amount of camera shake of the photographer, a grip sensor capable of detecting whether the photographer is holding the image capturing apparatus 100, and the like, or a combination thereof.

First Embodiment

Figure 2:
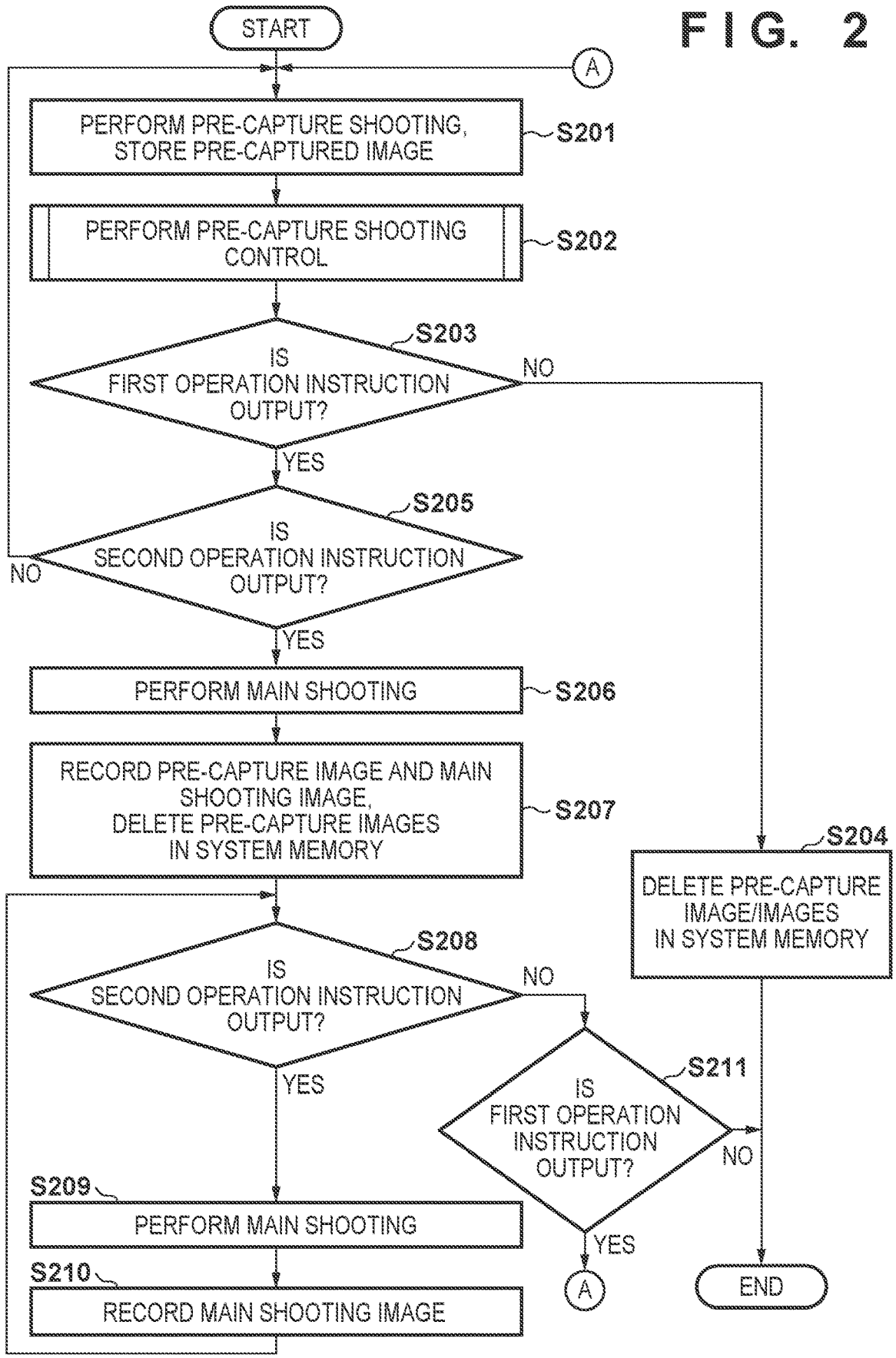
FIG. 2 is a flowchart showing shooting processing of the image capturing apparatus according to a first embodiment.

The shooting processing by the image capturing apparatus 100 having the above configuration in a first embodiment will be described below with reference to FIG. 2. The processing of a flowchart in FIG. 2 is started when the control unit 101 detects a first operation instruction output in response to a pressing operation of the first release switch of the operation unit 104 by the photographer.

In step S201, the control unit 101 performs pre-capture shooting and temporarily stores the obtained pre-capture image in the system memory 106. By default, pre-capture shooting is performed in a first shooting state, which will be described later.

Next, in step S202, pre-capture shooting control is performed. Here, the pre-capture shooting control will be described with reference to the flowchart of FIG. 3.

In step S301, the photographer sensing unit 111 acquires state information of a photographer and outputs it to the control unit 101. In the first embodiment, the photographer sensing unit 111 is assumed to have an in-camera capable of photographing a photographer, and, as the state information of the photographer, the photographer is photographed by the in-camera and the line of sight of the photographer is detected.

In step S302, the control unit 101 determines which of a first pre-capture control instruction and a second pre-capture control instruction is to be output to the image sensing unit 109 based on the state information of the photographer acquired by the photographer sensing unit 111, and outputs the determined control instruction. If the control unit 101 outputs the first pre-capture control instruction to the image sensing unit 109, the process proceeds to step S303, and if the control unit 101 outputs the second pre-capture control instruction, the process proceeds to step S304.

Here, the determination performed in step S302 will be described with reference to FIGS. 4A and 4B.

Figure 4A:
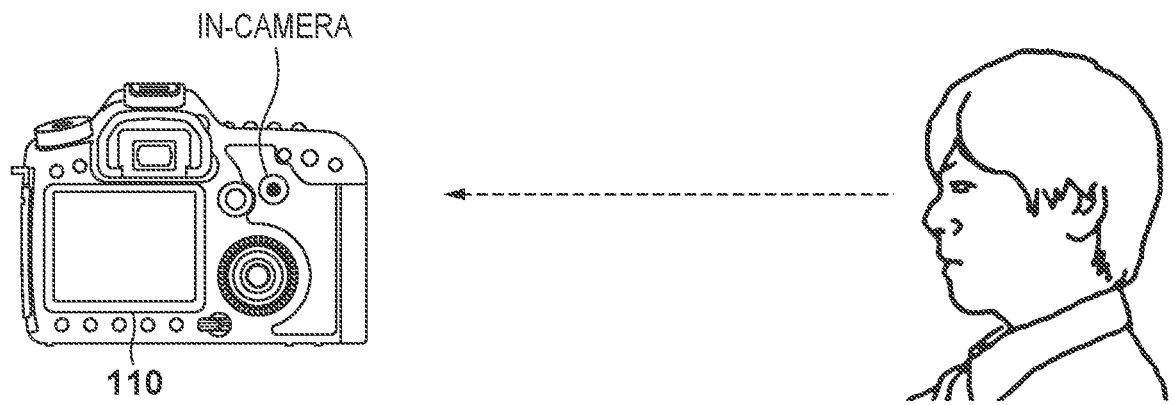
FIGS. 4A and 4B are explanatory diagrams for detecting the direction of the line of sight by a photographer sensing unit according to the first and second embodiments.
Figure 4B:
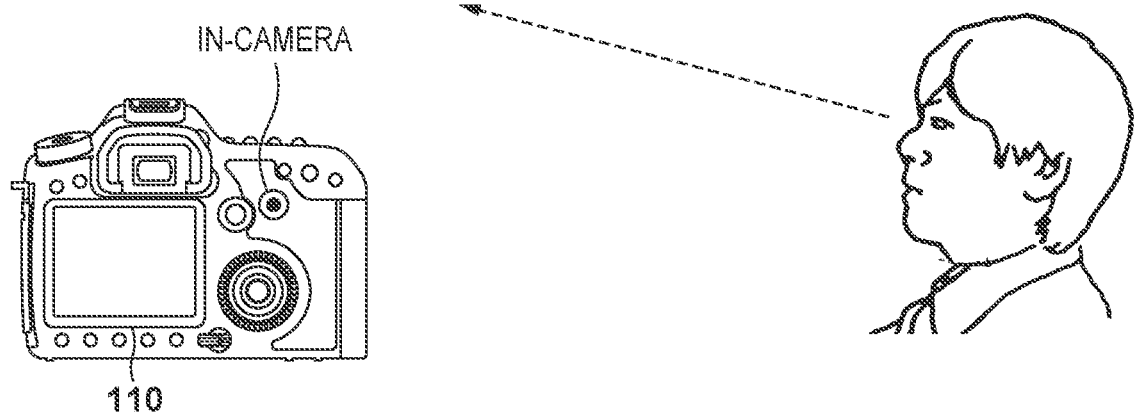

As shown in FIGS. 4A and 4B, the photographer sensing unit 111 is installed on the back of the image capturing apparatus 100 and has an in-camera capable of photographing a photographer, and the image capturing apparatus 100 acquires the line-of-sight information of the photographer from the image. As shown in FIG. 4A, if the control unit 101 detects the line-of-sight direction of the photographer gazing at the display unit 110 on the back of the image capturing apparatus 100 from the image captured by the in-camera as shown in FIG. 4A, the display unit 110 estimates that the photographer has an intention to shoot an image (i.e., there is high possibility that the photographer will instruct shooting), and notifies the image sensing unit 109 of the first pre-capture control instruction. On the other hand, as shown in FIG. 4B, if the line-of-sight direction of the photographer gazing at the display unit 110 on the back of the image capturing apparatus 100 is not detected, the display unit 110 estimates that the photographer does not have an intention to shoot an image (i.e., there is low possibility that the photographer will instruct shooting), and notifies the image sensing unit 109 of the second pre-capture control instruction.

In step S303, the first pre-capture control instruction is received and the image sensing unit 109 is actuated in a first shooting state, whereas in step S304, the second pre-capture control instruction is received and the image sensing unit 109 is actuated in a second shooting state. Here, the second shooting state indicates a state in which at least one of pre-capture shooting parameters, such as the frame rate, the recording image quality, and the number of pre-capture images to be held during pre-capture shooting, is reduced relative to the first shooting state. With such control, the pre-capture shooting can be performed while reducing the power consumption of the image capturing apparatus 100 when the photographer's shooting intention will be low.

In a case where the frame rate is reduced, the number of shots per a predetermined time can be reduced. Therefore, it is possible to reduce power consumption of the image sensing unit 109 that captures pre-capture images and transfers them to the control unit 101, the control unit 101 that processes the transferred pre-capture images, and the external recording unit 107 that records the image after main shooting which will be described later.

In a case where the recording image quality is reduced, the image size read out from the image sensing unit 109 per frame can be reduced. Therefore, power consumption of the image sensing unit 109, the control unit 101, and the external recording unit 107 can be reduced, as in the case of reducing the number of shots per the predetermined time.

In addition, in a case where the number of pre-capture images to be held is reduced, the number of pre-capture images held in the system memory 106 can be reduced. Therefore, power consumption at the time of temporarily recording the pre-capture images in the external recording unit 107 can be reduced.

After transitioning to the first shooting state in step S303, the control unit 101 instructs the photographer sensing unit 111 to operate in the power saving mode in step S305. On the other hand, after transitioning to the second shooting state in step S304, the control unit 101 instructs the photographer sensing unit 111 to operate in the normal mode in step S306.

In the power saving mode, the power consumption of the photographer sensing unit 111 is reduced by reducing the frame rate and/or resolution of the photographer sensing unit 111. If the photographer sensing unit 111 is operated in the power-saving mode, the performance of estimating the state of the photographer deteriorates; however, pre-capture shooting parameters are set by the photographer in the first shooting state, so the performance of the pre-capture shooting does not deteriorate. Therefore, in the first shooting state, the photographer sensing unit 111 is driven in the power saving mode, giving priority to reducing the power consumption of the photographer sensing unit 111 over the ability to estimate the state of the photographer.

On the other hand, in the second shooting state, if a transition from a low shooting intention to a high shooting intention of the state of the photographer is detected, it is necessary to immediately transition the shooting state to the first shooting state, restore the pre-capture shooting parameters, and perform pre-capture shooting. Therefore, in the second shooting state, the photographer sensing unit 111 is driven in the normal mode, giving priority to the ability to estimate the state of the photographer over the power consumption of the photographer sensing unit 111.

With this, the processing related to the pre-capture shooting control is completed, and the process proceeds to step S203 in FIG. 2.

In step S203, the control unit 101 determines whether or not a first operation instruction is output by pressing the first release switch of the operation unit 104 by the photographer. If the first operation instruction is output, the process proceeds to step S205, and if the first operation instruction is not output, the process proceeds to step S204.

In step S204, the control unit 101 erases the pre-capture images temporarily recorded in the system memory 106, and terminates the processing.

In step S205, the control unit 101 determines whether or not a second operation instruction is output by pressing the second release switch of the operation unit 104 by the photographer. If the second operation instruction is not output, the process returns to step S201 and repeats the above-described processes. As a result, pre-capture shooting is repeatedly performed while the first operation instruction is being output before the main shooting is performed. Also, in this case, pre-capture shooting is performed in either the first shooting state or the second shooting state set in step S202.

In addition, as described above, the system memory 106 temporarily holds a predetermined number of pre-capture images which are captured most recently. Note that the number of pre-capture images to be temporarily held can be appropriately changed, such as the number of images that the system memory 106 becomes full, the predetermined number of images, the number of images set by the photographer, or the like.

On the other hand, if the second operation instruction has been output, the process proceeds to step S206, and the control unit 101 controls the image sensing unit 109 to perform main shooting. In addition, unlike pre-capture shooting, main shooting refers to ordinary single-shot shooting in which one image is taken.

In step S207, the control unit 101 selects the pre-capture image captured at the timing immediately before the timing when the second operation instruction is output, among the pre-capture images stored in the system memory 106, and records the selected pre-capture image and a main shooting image obtained by main shooting in step S206 in the external recording unit 107. Note that the number of pre-capture image/images to be recorded together with the main shooting image is not limited to one, and may be plural. In a case of recording a plurality of pre-capture images, it is preferable to record the pre-capture images in the retroactive order of shooting timing from the timing closest to the output timing of the second operation instruction. After recording the images, all the pre-capture images stored in the system memory 106 are deleted. Note that this deletion process may be performed after the second operation instruction is no longer output.

In step S208, the control unit 101 determines whether or not the second operation instruction is output by the depression of the second release switch of the operation unit 104 by the photographer. If the second operation instruction is output, the process proceeds to step S209, and if the second operation instruction is not output, the process proceeds to step S211.

In step S209, the control unit 101 controls the image sensing unit 109 to perform main shooting. In step S210, the control unit 101 records a main shooting image acquired in step S209 in the external recording unit 107, and then returns to step S208 to repeat the above-described processes.

On the other hand, in step S211, the control unit 101 determines whether or not the first operation instruction is output by pressing the first release switch of the operation unit 104 by the photographer. If the first operation instruction is output, the process returns to step S201 and repeats the above-described processes. If the first operation instruction is not output, the processing is ended.

As described above, according to the first embodiment, in a case where the shooting intention of a photographer is estimated to be low according to the state information of the photographer, the pre-capture shooting parameters are changed to reduce at least one of the frame rate, recording quality, the number of pre-capture images to be held, and the like. With this, it is possible to save the power consumption when operating the image capturing apparatus. On the other hand, in a case where the shooting intention of the photographer is estimated to be high, the image desired by the photographer can be obtained by performing pre-capture shooting in the conventional manner.

Second Embodiment

Next, shooting processing by the image capturing apparatus 100 according to the second embodiment of the present invention will be described. Although the basic flow of shooting processing in this embodiment is the same as that in the first embodiment described with reference to FIG. 2, the pre-capture shooting control performed in step S202 is different. Therefore, the pre-capture shooting control in the second embodiment will be described below.

FIG. 5 is a flowchart showing the pre-capture shooting control performed in step S202 of FIG. 2 in the second embodiment.

First, in step S501, the photographer sensing unit 111 acquires the state information of a photographer and outputs it to the control unit 101. It should be noted that here as well, as the state information of the photographer, it is assumed that the photographer is shot by the in-camera provided in the photographer sensing unit 111 and the line of sight of the photographer is detected.

In step S502, the control unit 101 estimates whether the photographer's shooting intention is high based on the state information of the photographer obtained by the photographer sensing unit 111 as described above with reference to FIGS. 4A and 4B. If it is estimated that the photographer's shooting intention is high, the pre-capture shooting control ends, and the process proceeds to step S203 in FIG. 2. On the other hand, if it is estimated that the photographer's shooting intention is not high (low), the process proceeds to step S503.

In step S503, the control unit 101 determines whether a predetermined period of time has elapsed since it was assumed in step S502 that the photographer's shooting intention was low. If the predetermined period of time has elapsed, the process proceeds to step S504, and if the predetermined period of time has not elapsed, the process proceeds to step S505.

In step S504, the control unit 101 erases the pre-capture images temporarily held in the system memory 106. For example, when a period of about 5 seconds has passed when the photographer's shooting intention is low, it is determined that the pre-capture images temporarily held in the system memory 106 are not needed.

Next, in step S505, the control unit 101 determines whether or not a first operation instruction is output by pressing the first release switch of the operation unit 104 by the photographer. If the first operation instruction is output, the process proceeds to step S506, and if the first operation instruction is not output, the subroutine relating to pre-capture shooting control is terminated, and the process proceeds to step S204 in FIG. 2. Then, in step S204, if step S504 were skipped (that is, in a case where the first operation instruction has not been output within a predetermined period of time), the pre-capture images temporarily held in the system memory 106 are deleted, and then the processing is ended.

In step S506, the control unit 101 determines whether or not a second operation instruction is output by pressing the second release switch of the operation unit 104 by the photographer. If the second operation instruction is output, the subroutine relating to pre-capture shooting control is terminated, and the process proceeds to step S206 in FIG. 2. It should be noted that if the pre-capture images have been deleted in step S504, only a main shooting image is recorded in the external recording unit 107 in step S207 after performing the main shooting in step S206.

On the other hand, if the second operation instruction is not output in step S506, the process returns to step S501 and the above-described processes are repeated. In this way, by returning to step S501, while only the first operation instruction is output and the photographer's shooting intention is estimated to be low in step S502, the photographer's shooting intention is repeatedly estimated without performing pre-capture shooting.

Also, even if it is estimated that the photographer's shooting intention is low, if it is re-estimated that the photographers shooting intention is high in step S502, the process proceeds to step S203 in FIG. 2, and if NO in step S205 (only the first operation instruction is output), the process returns to step S201 and pre-capture shooting is performed. Thus, while only the first operation instruction is being output, it is possible to temporarily suspend pre-capture shooting while the photographer's shooting intention is low.

As described above, according to the second embodiment, in a case where it is estimated that the photographer's shooting intention is low based on the state information of the photographer, the pre-capture shooting is temporarily suspended, thereby it is possible to save power while operating the image capturing apparatus.

Third Embodiment

Next, shooting processing by the image capturing apparatus 100 according to the third embodiment of the present invention will be described. Although the basic flow of shooting processing in the third embodiment is the same as that in the first embodiment described with reference to FIG. 2, the pre-capture shooting control performed in step S202 is different. Therefore, the pre-capture shooting control in this embodiment will be described below.

Figure 6:
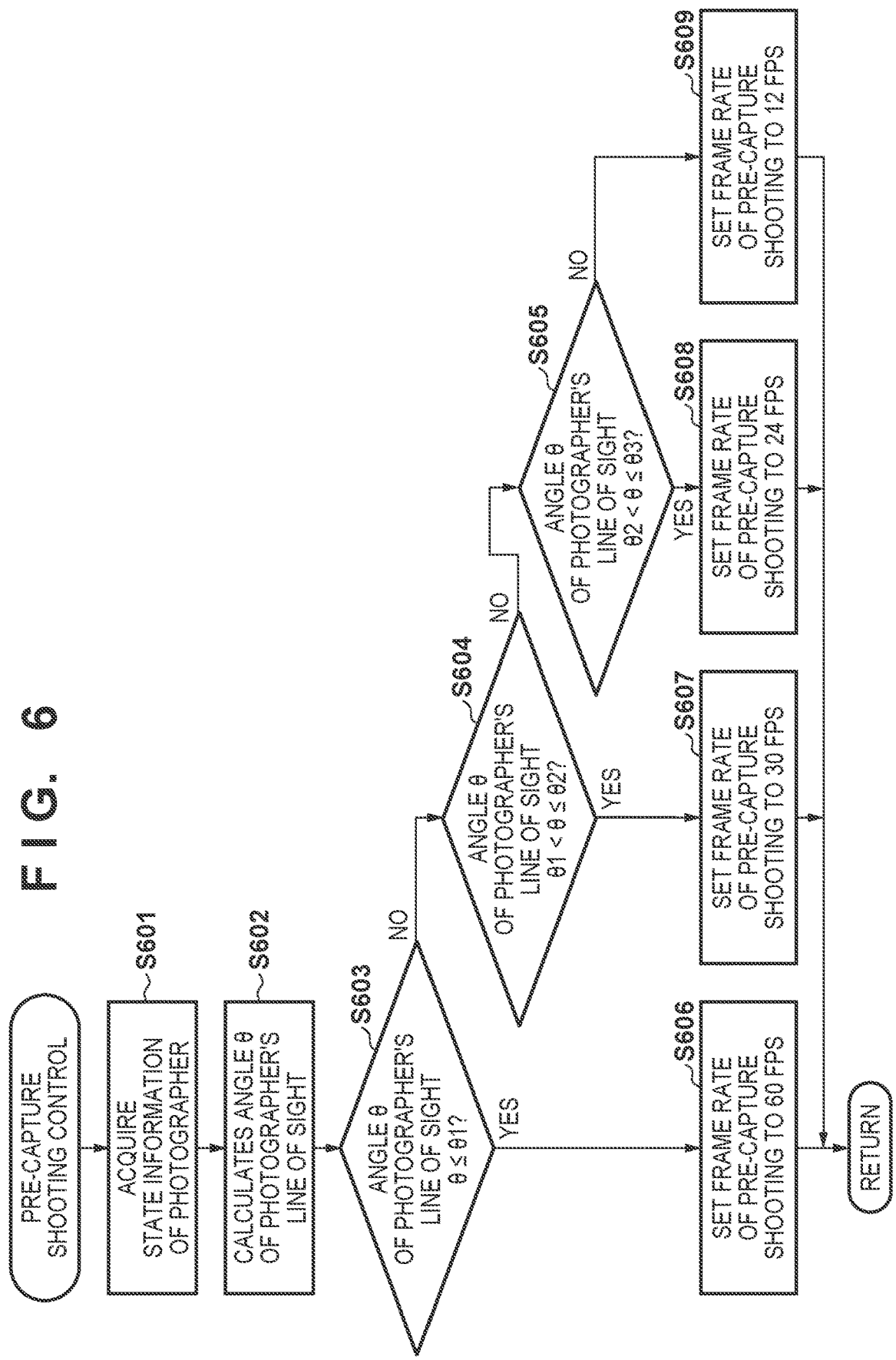
FIG. 6 is a flowchart showing pre-capture shooting control according to a third embodiment.

FIG. 6 is a flowchart showing the pre-capture shooting control performed in step S202 of FIG. 2 in the third embodiment.

First, in step S601, the photographer sensing unit 111 acquires the state information of a photographer and outputs it to the control unit 101. In step S602, the control unit 101 calculates the angle θ of the photographer's line of sight with respect to the image capturing apparatus 100 based on the state information of the photographer sent from the photographer sensing unit 111. Although the method of detecting the angle θ of the photographer's line of sight is not particularly limited, for example, the angle can be estimated using a pre-learned model such as deep learning. In this case, for example, image data captured by the in-camera may be used as input data, and a learning model learned by using angle information of a line of sight with respect to the image capturing apparatus may be used as teacher data.

Figure 7:
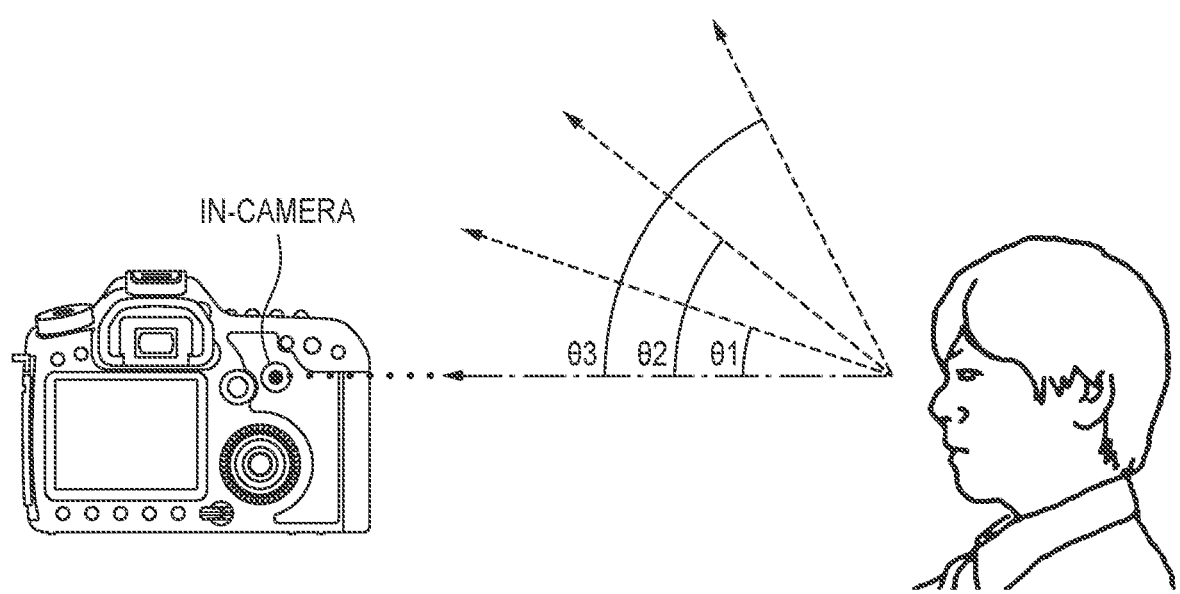
FIG. 7 is an explanatory diagram for detecting the direction of the line of sight by a photographer sensing unit according to the third embodiment.

Next, in the processes of steps S603 to S605, the angle θ of the obtained line-of-sight is determined step by step as shown in FIG. 7, for example. Here, as an example, determination is performed using θ1, θ2, and θ3 (θ1<θ2<θ3) as threshold values.

In step S603, the control unit 101 determines whether the angle θ calculated in step S602 satisfies θ≤θ1. If θ≤θ1 holds, then the process proceeds to step S606, and if θ≤θ1 does not hold, then the process proceeds to step S604.

In step S604, the control unit 101 determines whether the angle θ calculated in step S602 satisfies θ1<θ≤θ2. If θ1<θ≤θ2 holds, then the process proceeds to step S607, and if θ1<θ≤θ2 does not hold, then the process proceeds to step S605.

In step S605, the control unit 101 determines whether the angle θ calculated in step S602 satisfies θ2<θ≤θ3. If θ2<θ≤θ3 holds, then the process proceeds to step S608, and if θ2<θ≤θ3 does not hold, then the process proceeds to step S609.

In step S606, the control unit 101 sets the frame rate of pre-capture shooting to 60 fps in the image sensing unit 109.

In step S607, the control unit 101 sets the frame rate of pre-capture shooting to 30 fps in the image sensing unit 109.

In step S608, the control unit 101 sets the frame rate of pre-capture shooting to 24 fps in the image sensing unit 109.

In step S606, the control unit 101 sets the frame rate of pre-capture shooting to 12 fps in the image sensing unit 109.

When one of the processes from steps S606 to S609 is finished, the pre-capture shooting control is finished and the process proceeds to step S203 in FIG. 2.

In the third embodiment, the angle θ of the line-of-sight is classified into one of four angle ranges to change the frame rate; however, the number of stages is not limited to four. Also, the frame rate may be set as appropriate.

Further, in the above example, the case where the frame rate is changed according to the angle of the photographer's line of sight has been described, but the present invention is not limited to this. Power saving may be achieved by changing the resolution and/or the number of pre-capture images to be held depending on the angle range.

As described above, according to the third embodiment, by changing the pre-capture shooting parameter step by step according to the photographer's shooting intention based on the state information of the photographer, the image capturing apparatus can operate with lower power consumption when it is estimated that the shooting intention is lower. On the other hand, when it is estimated that the photographer's shooting intention is a higher, it is possible to obtain the desired image of the photographer more easily.

Fourth Embodiment

Figure 8:
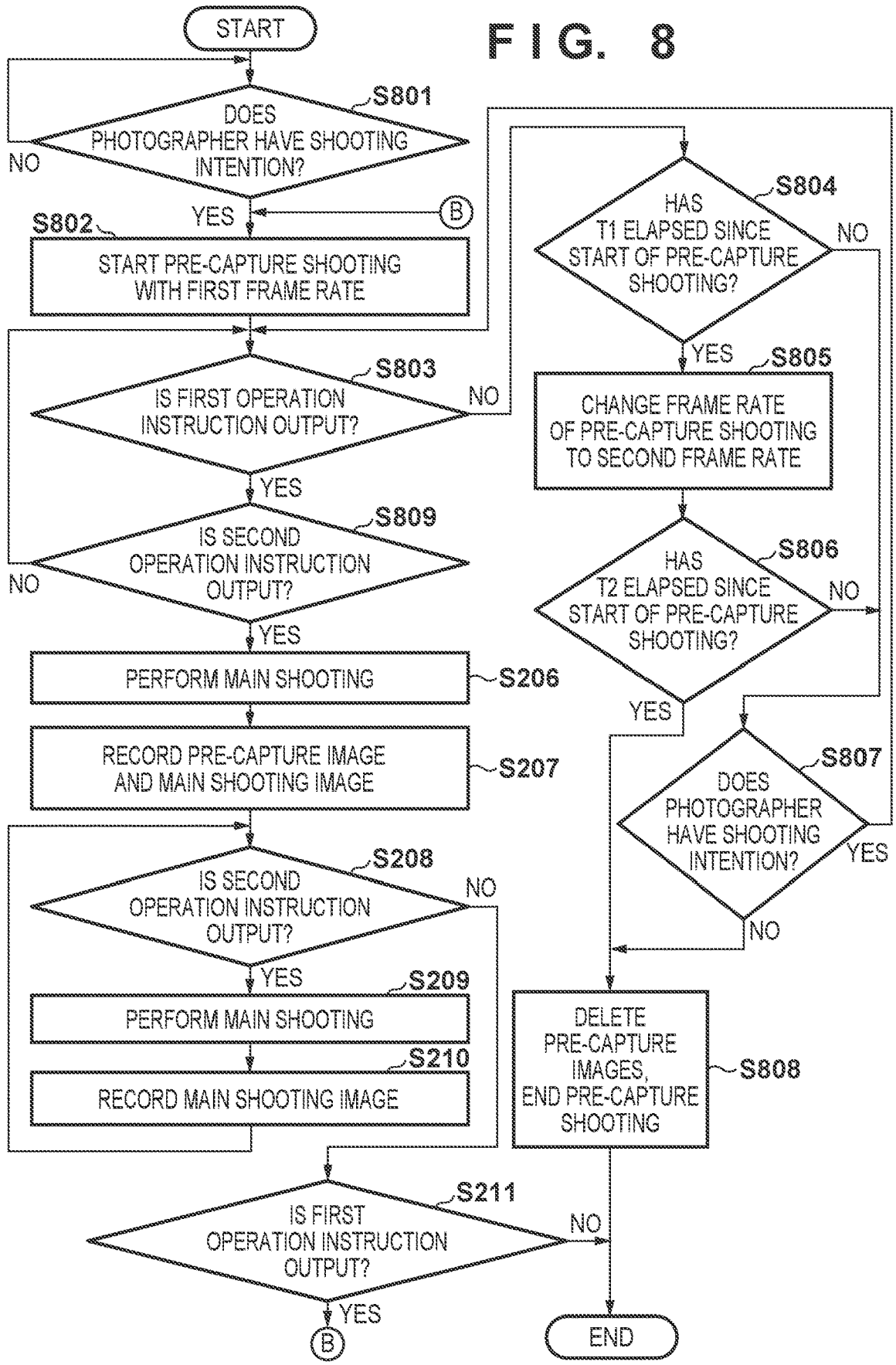
FIG. 8 is a flowchart showing processing operations of an image capturing apparatus according to a fourth embodiment.

Next, with reference to FIG. 8, shooting processing in the fourth embodiment by the image capturing apparatus 100 will be described.

In step S801, the control unit 101 acquires the state information of the photographer from the photographer sensing unit 111, and estimates whether or not the photographer has a shooting intention. The method of estimating the photographer's shooting intention is not particularly limited. For example, the method may be as that described in the first embodiment with reference to FIGS. 4A and 4B, or the photographer's shooting intention may be estimated from the amount of camera shake or by determining whether or not the photographer is holding the image capturing apparatus 100 or not. If it is estimated that the photographer has a shooting intention, the process proceeds to step S802. If it is estimated that the photographer's shooting intention is low, the process of step S801 is repeated.

In step S802, the control unit 101 notifies the image sensing unit 109 of an instruction to start pre-capture shooting, and pre-capture shooting is started. At this time, the frame rate of the pre-capture shooting is a first frame rate. The first frame rate may be, for example, a frame rate of 60 fps, which can shoot a fast moving subject. While the pre-capture shooting is being performed, as described above, pre-capture images are temporarily stored in the system memory 106 with a predetermined number of images as the maximum.

In step S803, the control unit 101 determines whether or not a first operation instruction is output by pressing the first release switch of the operation unit 104 by a photographer. If the first operation instruction is output, the process proceeds to step S809, and if the first operation instruction is not output, the process proceeds to step S804.

In step S804, the control unit 101 determines whether or not a predetermined time T1 has elapsed since the start of pre-capture shooting with no output of the first operation instruction. If the time T1 has not elapsed, the process proceeds to step S807, and if the time T1 has elapsed, the process proceeds to step S805.

In step S805, pre-capture shooting is performed at the second frame rate. At this time, if the pre-capture shooting is being performed at the first frame rate, the settings are changed to the second frame rate. Here, if the first frame rate is 60 fps, the second frame rate may be set to a value slower than the first frame rate, such as 30 fps.

Next, in step S806, the control unit 101 determines whether or not a predetermined time T2 has passed without the first release switch being pressed since the start of pre-capture shooting. If the predetermined time T2 has not passed, the process proceeds to step S807, and when the predetermined time T2 has elapsed, the process proceeds to step S808.

In step S807, similarly to S801, it is estimated whether or not the photographer has a shooting intention. If it is estimated that the photographer has a shooting intention, the process returns to step S803 to repeat the above processes, and if it is estimated that the photographer's shooting intention is low, the process advances to step S808.

In step S808, the control unit 101 deletes all the pre-capture images temporarily held in the system memory 106, notifies the image sensing unit 109 of an end instruction of pre-capture shooting, and ends the processing.

The operations of steps S804 to S808 are aimed at stopping pre-capture shooting if it is judged that line-of-sight detection by the photographer sensing unit 111 is accidental and there is no intended to shoot. Even if the photographer sensing unit 111 detects the line of sight, determines that the photographer has shooting intention, and starts pre-capture shooting in step S801, when the predetermined time T1 has elapsed with no pressing of the first release button which is an operation for shooting, it is determined that the shooting intention is suspicious, and the frame rate is lowered to reduce power consumption. Furthermore, if the elapsed time exceeds the predetermined time T2, it is determined that the shooting intention is low, and the pre-capture shooting is stopped, thereby further reducing power consumption.

As described above, the predetermined time T1 is a time for judging a suspicion of photographing intention, and T2 is set to an elapsed time sufficient for judging that there is no shooting intention. For example, T1=10 seconds and T2=30 seconds. Also, if the photographer sensing unit 111 detects that detection of the photographer's line of sight is canceled before the predetermined times T1 and T2 elapse (YES in step S807), the process proceeds to step S808 at that point, and the pre-capture shooting is ended.

The predetermined times T1 and T2 may be changed depending on the stability of the image capturing apparatus 100 (for example, hand-held shooting or tripod shooting). An acceleration sensor may be mounted on the image capturing apparatus 100 to detect the magnitude of vibration of the image capturing apparatus 100, and a mechanical switch attached to the tripod section may be used to determine whether shooting will be performed in a state that the camera is attached to a tripod or hand-held shooting will be performed. In a case of using the magnitude of the vibration for the determination, if the vibration is smaller than a predetermined vibration (if the stability is high), it is determined that the shooting will be performed on a tripod, and if it is larger than the predetermined vibration (if the stability is low), it is determined that the shooting will be hand-held shooting. Also, when shooting will be performed on a tripod, there is a possibility that the photographer may be away from the image capturing apparatus 100, and if he/she intends to shoot, he/she will need to get closer to the image capturing apparatus 100 in order to operate the operation unit 104 to shoot, which may take time. Therefore, the predetermined times T1 and T2 may be set longer when shooting will be performed on a tripod than when shooting will be hand-held shooting.

On the other hand, if it is determined in step S803 that the first operation instruction has been output, in step S809 the control unit 101 determines whether or not the second operation instruction which is output as the photographer presses the second release switch of the operation unit 104 is output. If the second operation instruction is output, the process proceeds to step S206, and if the second operation instruction is not output, the process returns to step S803 and repeats the above-described processes.

Note that the processes of steps S206 to S211 are the same as the processes described above with reference to FIG. 2, so the description thereof is omitted.

In scenes where the photographer is away from the image capturing apparatus 100 such as in a case of shooting on a tripod and looks for a subject, if the photographer tries to give the first shooting instruction after finding the subject, the photographer will need to move to the camera, and shooting chance of the subject may be missed during moving to the camera. On the other hand, constant pre-capture shooting wastes power when the photographer has no intention to shoot.

In contrast, according to the fourth embodiment, pre-capture shooting is started in response to the estimation that the photographer has a shooting intention based on the detection result of the photographer sensing unit 111. As a result, it is possible to prevent missing a shot due to the delay of the first shooting instruction, and to suppress power consumption in a scene in which the shooting intention is low.

In the first to fourth embodiments, it is assumed that the state information of the photographer is the photographer's line of sight captured and detected by the in-camera of the photographer sensing unit 111; however, the invention is not limited to this. For example, an in-camera may be used to detect the direction of the photographer's face or body. Furthermore, as a photographer sensing unit 111, a camera shake detection sensor capable of detecting an amount of camera shake of the photographer, sensors that can detect the state information of a photographer, such as a grip sensor capable of detecting whether the photographer is holding the image capturing apparatus, etc. may be used regardless of its form.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-197874, filed Dec. 6, 2021 which is hereby incorporated by reference herein in its entirety.

What is claimed is:

1. An electronic device comprising one or more processors and/or circuitry which functions as:
    a controller that performs a control for recording image data of a first image shot by a first image sensor in response to a second operation instruction for instructing recording of a shot image by a photographer and image data of second images of a plurality of frames shot by the first image sensor immediately before the first image is shot in a memory;
    wherein the controller detects a state of the photographer and performs control such that at least frame rate or resolution of the second images of the plurality of frames is changed in accordance with the detected state of the photographer.

2. The electronic device according to claim 1, wherein the state of the photographer is detected from image data of an image shot by a second image sensor, different from the first image sensor for shooting the photographer.

3. The electronic device according to claim 1, wherein the state of the photographer includes at least an angle of line of sight, an angle of face, or an angle of body of the photographer.

4. The electronic device according to claim 1, further comprising an operation unit that outputs a first operation instruction for instructing preparation for shooting and the second operation instruction,
    wherein the controller temporarily stores the image data of the second images of the plurality of frames in a memory while the first operation instruction is output and held, and record the image data of the first image and the image data of the second images in the memory in response to the second operation instruction.

5. An electronic device comprising one or more processors and/or circuitry which functions as:
    a controller that performs a control for recording image data of a first image shot by a first image sensor in response to a second operation instruction for instructing recording of a shot image by a photographer and image data of second images of a plurality of frames shot by the first image sensor immediately before the first image is shot in a memory,
    wherein the controller detects a stability of the electronic device and performs control such that at least frame rate or resolution of the second images of the plurality of frames is changed in accordance with the detected stability.

6. The electronic device according to claim 5, wherein the stability of the electronic device is detected by detecting shake of the electronic device.

7. The electronic device according to claim 5, further comprising an operation unit that outputs a first operation instruction for instructing preparation for shooting and the second operation instruction for instructing recording of a shot image,
    wherein the controller temporarily stores the image data of the second images of the plurality of frames in a memory while the first operation instruction is output and held, and record the image data of the first image and the image data of the second images in the memory in response to the second operation instruction.

8. The electronic device according to claim 5, wherein the stability of the electronic device is detected by detecting whether or not the electronic device is mounted on a tripod.

9. A control method of an electronic device comprising:
    performing a control for recording image data of a first image shot by a first image sensor in response to a second operation instruction for instructing recording of a shot image by a photographer and image data of second images of a plurality of frames shot by the first image sensor immediately before the first image is shot in a memory;
    wherein, in the control, a state of the photographer is detected and at least frame rate or resolution of the second images of the plurality of frames is controlled to be changed in accordance with the detected state of the photographer.

10. A control method of an electronic device comprising:
    performing a control for recording image data of a first image shot by a first image sensor in response to a second operation instruction for instructing recording of a shot image by a photographer and image data of second images of a plurality of frames shot by the first image sensor immediately before the first image is shot in a memory,
    wherein, in the control, a stability of the electronic device is detected and at least frame rate or resolution of the second images of the plurality of frames is controlled to be changed in accordance with the detected stability.

11. A non-transitory computer-readable storage medium, the storage medium storing a program that is executable by the computer, wherein the program includes program code for causing the computer to function as an electronic device comprising:
    a controller that performs a control for recording image data of a first image shot by a first image sensor in response to a second operation instruction for instructing recording of a shot image by a photographer and image data of second images of a plurality of frames shot by the first image sensor immediately before the first image is shot in a memory;
    wherein the controller detects a state of the photographer and performs control such that at least frame rate or resolution of the second images of the plurality of frames is changed in accordance with the detected state of the photographer.

12. A non-transitory computer-readable storage medium, the storage medium storing a program that is executable by the computer, wherein the program includes program code for causing the computer to function as an electronic device comprising:
    a controller that performs a control for recording image data of a first image shot by a first image sensor in response to a second operation instruction for instructing recording of a shot image by a photographer and image data of second images of a plurality of frames shot by the first image sensor immediately before the first image is shot in a memory,
    wherein the controller detects a stability of the electronic device and performs control such that at least frame rate or resolution of the second images of the plurality of frames is changed in accordance with the detected stability.

* * * * *